Patented Apr. 4, 1950

2,502,949

UNITED STATES PATENT OFFICE 2,502,949

DENSE RUBBERY COMPOSITIONS

Richard M. Howlett, Roselle, and Raymond G. Newberg, Cranford, N. J., assignors to Standard Oil Development Company, a corporation of Delaware No Drawing. Application October 5, 1945, Serial No. 620,632

3 Claims. (Cl. 260—41.5)

This invention relates to an improved method for incorporating dense fillers in rubbery compositions and forming improved products. More particularly, this invention relates to incorporation of fusible metallic substances, as dense fillers, in a fused condition into a rubbery compound at a processing temperature.

High density rubber stocks have at times been made by incorporating powdered lead. The lead incorporated stocks have had various uses as counterweights, X-ray blocking and X-ray protective materials, and others. The incorporation and dispersion of the lead was difficult. The power consumption in milling was excessive. The stocks were difficult to mold.

The difficulties of incorporating powdered lead in a rubber stock are overcome by the method of this invention, by which a metal is incorporated as a liquid or molten mass into a rubbery compound at processing temperatures.

An object of this invention is to provide a method of incorporating a metal in fused condition into rubbery compounds at normal processing temperatures, preferably at temperatures below 300° F.

The dense metallic substance or filler may be a metal or alloy which melts or softens at the processing temperature and preferably at a temperature below 300° F. A number of alloys containing bismuth, tin, and lead are suitable. Wood's alloy, which is composed of about 50% bismuth, 25% lead, 12.5% tin, and 12.5% cadmium and has a melting point of about 65.5° C., may be used.

The method is applicable for incorporating the fusible metallic fillers into stocks of natural and synthetic rubbers. The synthetic rubbers include vulcanizable rubbery gums or resins, such as copolymers of butadiene, isoprene, or other diolefins with styrene, alpha alkyl styrenes, ring substituted alkyl styrenes, chloro-styrenes, acrylonitrile, alpha methacrylonitrile, unsaturated esters like methyl methacrylate or other copolymerizable organic compounds. It is also advantageously applicable to rubbery copolymers having relatively low unsaturation, such as butyl rubber copolymers.

Butyl rubber copolymers are in general copolymers of olefins, such as isobutylene, with smaller amounts of diolefins. Methods of producing and the properties of these copolymers are described in the U. S. Patent 2,356,128, issued August 22, 1944, to Robert M. Thomas et al. The copolymerized monomers are preferably such proportions as 70 to 99½ parts of isobutylene with 30 to ½ parts of diolefin, e. g., of isoprene or butadiene. These copolymers have high chemical resistance and are in some respects extraordinary in processing and vulcanizing.

For one mode of operation, the stock is placed on a warm mill and the melted metal is readily worked into the polymeric material in a manner commonly used for incorporating liquid softeners. So long as the metal is kept above its melting point, mixing proceeds in a normal fashion. This condition is obtained with a stock having a suitable temperature in being processed on the warm mill.

Wood's alloy or metal was compounded into typical butyl rubber stocks with substantiation of the foregoing principles. All ingredients except the metal were incorporated in the stock by following normal mixing procedure on a rubber mill. The mill temperature was then raised to 160° F. and a stick of Wood's alloy was pressed against the hot back roll. The metal immediately became fluid and worked into the stock with no difficulty. The finished stock was cured satisfactorily in 60 minutes at 307° F. with no sign of bloom and a satisfactory smooth sheet was obtained. Illustrative details are given in the following table.

TABLE I

*Densified butyl rubber*

| Ingredients | Parts By Weight |
| --- | --- |
| Pure Gum (Butyl rubber copolymers) | 100 |
| Zinc Oxide | 5 |
| Stearic Acid | 3 |
| Celite (Hydrated amorphous silica) | 20 |
| Tuads (Tetra methyl thiuram disulfide) | 1 |
| Sulfur | 1.5 |
| Wood's Alloy | 25 |

Cure: 60 minutes at 307° F.

The stocks are molded with no difficulty. For example, compounding ingredients containing preferably a delayed action accelerator may be placed in a mold without applying pressure until the stock temperature is above the melting point of the metal, e. g., above 65° C. for Wood's alloy. When the pressure is applied, the metal becomes liquid, and free flowing stock in the mold is assured.

A metal may be similarly incorporated into stocks of natural rubber and synthetic rubbers of various types, e. g., copolymers of butadiene with styrene (Buna S), copolymers of butadiene with acrylonitrile (Perbunan), representative of other vulcanizable rubbery gums or resins.

In compounding stocks described in the following tables, the normal compounding procedure was followed. Fillers including the Wood's metal were mixed into the gum first. The stock was then removed from the mill and allowed to cool. After cooling, the accelerators, activators, and 1.5 to 4 parts of sulfur per 100 parts of gum were added as in normal compounding.

TABLE II

*High density butyl rubber*

| Ingredients | Parts by Weight | |
|---|---|---|
| GR-I (pure gum butyl) | 100 | 100 |
| Zinc Oxide | 5 | 10 |
| Stearic Acid | 3 | 3 |
| Tuads (Tetra methyl thiuram disulfide) | 1 | 2 |
| Captax (Mercaptobenzothiazole) | 0.5 | 1 |
| Sulfur | 1.5 | 4 |
| Celite (Hydrated amorphous silica) | 25 | 25 |
| Wood's Metal | 50 | 100 |
| Cabot #9 (Easy processing channel black) | | 25 |
| Specific Gravity at 25° C | 1.41 | 1.67 |
| Tensile—Modulus at 300% | 940-70 | 1,750-260 |
| Elong.—Shore at 30 sec | 1,090-23 | 730-44 |
| Cure: | | |
| 90 min. at 307° F | 1,130-70 | 1,660-340 |
| 150 min. at 307° F | 1090-25 | 660-45 |

TABLE III

*High density perbunan*

| Ingredients | Parts by weight | |
|---|---|---|
| Perbunan 26 (pure gum) | 100 | 100 |
| Zinc Oxide | 5 | 10 |
| Stearic Acid | 1 | 2 |
| Altax (Benzothiazyl Disulfide) | 1 | 2 |
| Pine Tar | 10 | |
| Sulfur | 2.5 | 5 |
| Celite (Hydrated amorphous silica) | 25 | |
| Gastex (Semi-reinforcing furnace black) | | 25 |
| Wood's Metal | 50 | 50 |
| Specific Gravity at 25° C | 1.41 | 1.50 |
| Tensile—Elong.—Shore at 30 sec.: | | |
| Cure: | | |
| 90 min. at 307° F | | 1360—220—53 |
| 120 min. at 307° F | | 1230—210—61 |
| 150 min. at 307° F | 120—680—18 | 1,350—230—58 |

TABLE IV

*High density Buna S*

| Ingredients | Parts by Weight | |
|---|---|---|
| GR-S (pure gum Buna S) | 100 | 100 |
| Zinc Oxide | 5 | 10 |
| Stearic Acid | 1 | 2 |
| Captax (Mercaptobenzothiazole) | 1.5 | |
| Monex (Tetra methyl thiuram monosulfide) | 1.2 | |
| Altax (Benzothiazyl disulfide) | | 2 |
| Sulfur | 3.0 | 5 |
| Celite (Hydrated amorphous silica) | 25 | |
| Gastex (Semi-reinforcing furnace black) | | 25 |
| Wood's Metal | 50 | 50 |
| Specific Gravity at 25° C | 1.41 | 1.46 |
| Tensile—Elong.—Shore at 30 sec.: | | |
| Cure: | | |
| 90 min. at 307° F | | 700—180—56 |
| 120 min. at 307° F | | 1,530—270—54 |
| 150 min. at 307° F | 370—840—19 | 1,620—280—55 |

TABLE V

*High density natural rubber*

| Ingredients | Parts by Weight |
|---|---|
| Smoked Sheet | 100 |
| Zinc Oxide | 5 |
| Stearic Acid | 1 |
| Altax (Benzothiazyl disulfide) | 1 |
| Tauds (Tetra methyl thiuram disulfide) | 0.1 |
| Sulfur | 2.75 |
| Celite (Hydrated amorphous silica) | 25 |
| Wood's Metal | 25 |
| Specific Gravity at 25° C | 1.25 |
| Tensile—Modulus at 300% | 2,310—400 |
| Elongation—Shore at 30 sec | 690— 38 |
| Cure: | |
| 90 min. at 287° F | 2,270—390 |
| 150 min. at 287° F | 690— 36 |

In molding stocks such as illustrated in Tables II to V, no warm-up time was necessary. The stocks were free flowing and the metal was dispersed so that the composition was homogeneous with no globules of metal detectable.

Amounts ranging from 1 or several parts to 300 parts of the metallic filler per 100 parts of gum may be incorporated with advantages sought and obtained, such as ease of dispersion, heavy loading without excessive hardness or stiffness, satisfactory molding quality, smoothness, and capability of being flexed without cracking.

The ease of dispersion and curing with compositions containing conventional ingredients and under ordinary processing conditions was surprising. Conditions of overheating that cause deterioration of the stock were fully avoided.

Other modifications are intended to be included within the scope of the invention as defined in the appended claims.

We claim:

1. In the method of producing a dense rubbery article, the improved step which comprises adding in the molten state from 1 to 300 parts of an alloy of 50% bismuth, 25% lead, 12½% tin and 12½% cadmium to 100 parts of a rubbery copolymer of 70 to 99½% of isbutylene and of 30 to ½% of a conjugated diolefin, thoroughly mixing the molten alloy into the rubbery copolymer by mastication at a temperature which is above the melting point of the alloy and vulcanizing the resulting composition at a temperature above the melting point of the alloy.

2. In the method of producing a dense vulcanized rubbery article, the step which comprises adding in the molten state from 1 to 300 parts of an alloy of 50% bismuth, 25% lead, 12½% tin and 12½% cadmium, and 1.5 to 4 parts of sulfur to 100 parts of a rubbery copolymer of 70 to 99½% of isobutylene and 30 to ½% of isoprene, thoroughly mixing the molten alloy into the rubbery copolymer by mastication at a temperature which is above the melting point of the alloy, and vulcanizing the resulting composition at a temperature above the melting point of the alloy.

3. In the method of producing a dense vulcanized rubbery article, the step which comprises adding 100 parts of a molten alloy of 50% bismuth, 25% lead, 12½% tin and 12½% cadmium, and 4 parts of sulfur to 100 parts of a rubbery copolymer of 70 to 99½% of isobutylene and 30 to ½% of isoprene, thoroughly mixing the molten alloy into the rubbery copolymer by mastication at a temperature which is above the melting point of the alloy, and vulcanizing the resulting composition at about 307° F.

RICHARD M. HOWLETT.
RAYMOND G. NEWBERG.

REFERENCES CITED

The following references are of record in the file of this patent:

UNITED STATES PATENTS

| Number | Name | Date |
|---|---|---|
| 2,258,774 | Kuzmick | Oct. 14, 1941 |

OTHER REFERENCES

Enjay "Butyl," Enjay Co., Inc. (1948), Sec. II, Table I.